United States Patent
DeWittie et al.

[15] 3,647,396
[45] Mar. 7, 1972

[54] PRODUCTION OF HIGH-PURITY SALT

[72] Inventors: H. W. DeWittie, Waverly, Pa.; John A. Kirchstein, Cleveland, Ohio; Kishore M. Atit, Dalton, Pa.

[73] Assignee: International Salt Company, Clarks Summit, Pa.

[22] Filed: Feb. 25, 1969

[21] Appl. No.: 801,938

[52] U.S. Cl. ................................ 23/299, 23/303, 23/313, 209/5
[51] Int. Cl. .................................. C01d 3/14, C01f 11/46
[58] Field of Search ............... 23/300, 312 AH, 303, 42, 89, 23/313, 37, 299, 297, 298; 209/5; 210/54

[56] References Cited

UNITED STATES PATENTS

| | | |
|---|---|---|
| 2,876,182 | 3/1959 | Hopper et al. .......................... 23/303 |
| 2,906,599 | 9/1959 | Roland .................................... 23/42 |
| 3,241,929 | 3/1966 | Jordan .................................... 23/42 |
| 3,353,927 | 11/1967 | Ralston .................................. 23/304 |
| 3,499,724 | 3/1970 | Franz ..................................... 23/89 |

Primary Examiner—Norman Yudkoff
Assistant Examiner—S. Silverberg
Attorney—Bean & Bean

[57] ABSTRACT

Recrystallization of sodium chloride in the form of high-purity cubic crystals from a sodium chloride source containing calcium sulphate impurity by multieffect evaporation preceded by treatment of the hot sodium chloride saturated brine by flocculents and settling, to cause the undissolved calcium sulphate particles and any other suspended solids to agglomerate and settle out of the brine prior to recrystallization of the sodium chloride. The conventional requirement for filtering the hot brine is completely eliminated.

6 Claims, 2 Drawing Figures

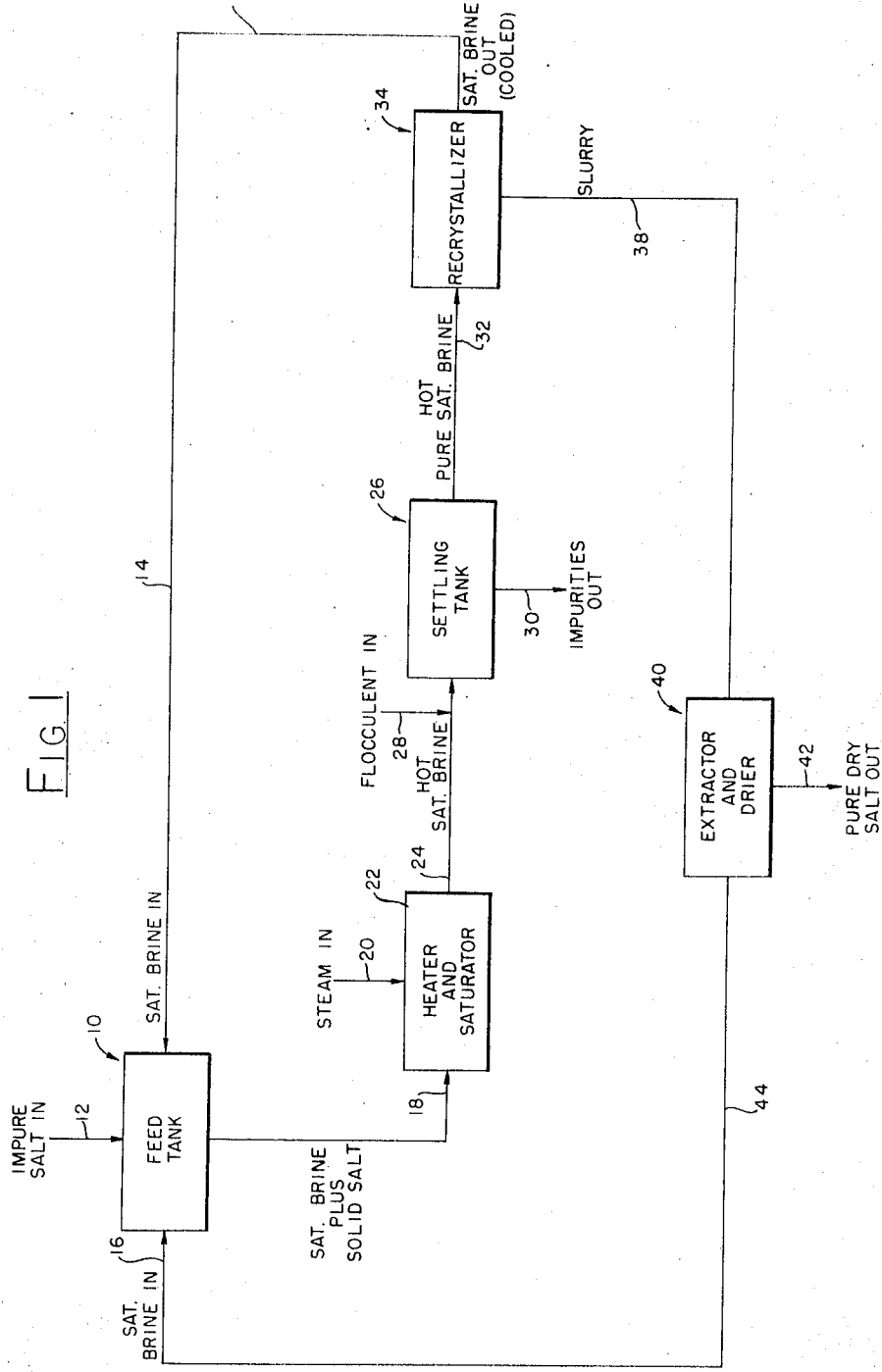

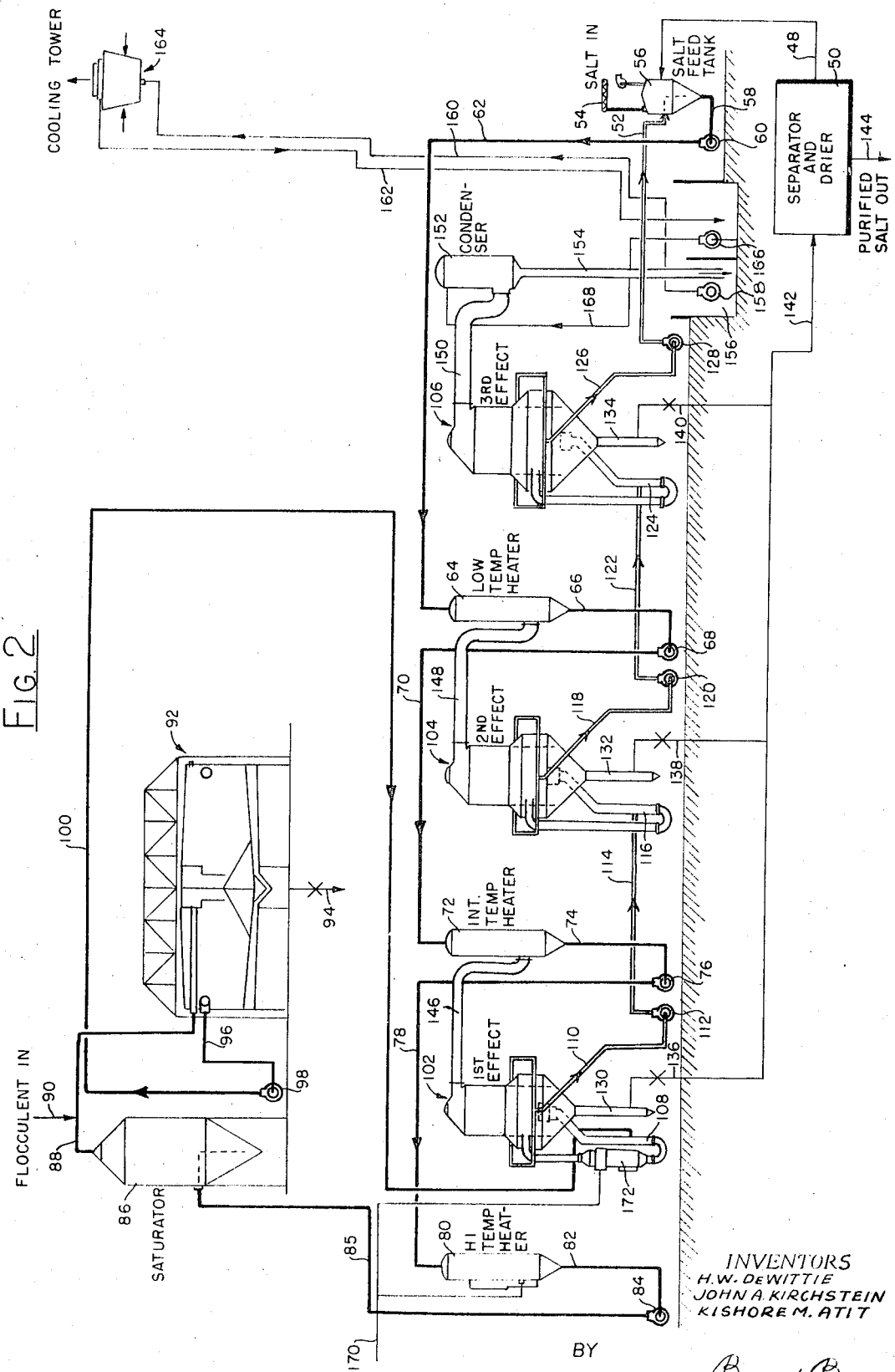

PRODUCTION OF HIGH-PURITY SALT

BACKGROUND OF THE INVENTION

The production of high-purity sodium chloride in the form of small cubic crystals has been practiced for many years, the process used being one of recrystallization. Because the principal impurity of rock salt is calcium sulphate which has a solubility varying inversely with temperature whereas sodium chloride exhibits solubility varying directly with temperature, a recrystallization process is particularly well suited for high-purity sodium chloride production from an impure salt source such as rock salt. In general, the prior art processes involve the formation of a sodium chloride saturated brine at a sufficiently high temperature as to assure that the calcium sulphate impurity is present in such brine largely in the form of small crystals which have crystallized out of or have not been able to go into solution in the hot brine, leaving but a small residual of calcium sulphate in solution. This hot brine containing the calcium sulphate crystals and other solid impurities such as clay or dirt particles, is then subjected to a thorough filtering process to remove the very fine calcium sulphate crystals and other solid impurities, whereafter the purified hot brine is subjected to evaporation, usually a multieffect evaporation process, and cooling to recrystallize the sodium chloride as small cubic crystals of high purity.

Although the above process as generally outlined has been practiced for many years, having provoked many improvements and refinements therein in the interim, one drawback has plagued the industry since the inception of the process. This drawback concerns the filtering of the hot, impure brine to remove the solid impurities. Because the solid calcium sulphate is of very fine form, the filtering must be carried out with care and precision, and of necessity must involve the use of small grain size filtering medium in order to retain the fine impurity particles. This, in turn, has limited the unit area flow rates which may be employed in the filtering equipment. The depth and fineness of the filtering medium bed necessary to obtain the requisite filtering effect is such that the rate of flow which may be employed without danger of washing or "breaking through" the filter bed is definitely limited. Then, too, provision must be made for periodic interruption of the process in order to allow a backwash cleaning of the filter bed. Thorough and effective cleaning is difficult since the everattendant possibility of system contamination by the fine particle filter medium during such backwash operation exists due to the fact that relatively high-backwash flow rates are required.

In order to relieve the filter of some of the filtering load, the use of a settling tank to remove the larger impurity particles prior to filtering has been employed with some success, although the basic problems inherent with the use of filters are not overcome thereby.

In addition to the above, and aside from the initial cost of equipment involved in establishing a good filter system, the maintenance cost of the filters is quite high, principally because the hot brine rather quickly destroys the filter bed support screens, or the like, requiring their frequent replacement in order to avoid the possibility of their collapse which would quickly allow the filtering medium to contaminate the entire system.

For the above reasons, many efforts to refine and improve the filtering equipment used have been made over the years and, indeed, the art has progressed to a high state of development in this area.

BRIEF SUMMARY OF THE INVENTION

The present invention represents a complete break with the tradition of the prior art regarding the recrystallization of impure sodium chloride inasmuch as the concepts involved herein allow the construction of a recrystallization system which does not require the use of the above-discussed prior art filter equipment in any form, and thus completely removes this most serious problem which has plagued the recrystallization systems of the prior art for many years.

Essentially, the present invention involves the discovery that flocculating agents may be employed in a hot, impure brine to cause the calcium sulphate particles as well as other solid fine impurities to agglomerate or otherwise group together in such large flocs that the simple expedient of gravity separation is effective to produce a salt product having an even higher purity than has been accomplished by the exotic and highly refined filtering systems of the prior art.

Thus, aside from the higher produce purity attained and the reduction both in original equipment and maintenance costs as well, the present invention not only simplifies the system by eliminating an otherwise essential portion thereof, but also allows the system to operate at higher flow rates and with greater efficiency.

BRIEF DESCRIPTION OF THE DRAWING FIGURES

FIG. 1 is a diagrammatic view illustrating the principles according to the present invention; and FIG. 2 is a view showing a preferred embodiment of the invention.

DETAILED DESCRIPTION OF THE INVENTION

With reference at this time more particularly to FIG. 1, the system as diagrammatically illustrated therein shows a feed tank indicated generally by the reference character 10 to which the sodium chloride salt is applied as indicated by the reference character 12 and saturated sodium chloride brine inputs 14 and 16 also provide inputs to the tank 10. The flow rates at 12, 14 and 16 are such as to produce at the outlet 18 a brine solution having suspended and entrained therein, a quantity of solid impure sodium chloride from the source at 12. This flowing stream of brine and solid impure salt is then subjected to the application of external heat as indicated by the reference character 20 within suitable heating and saturating apparatus 22 of the system to produce at the outlet 24 a hot impure sodium chloride saturated brine. This sodium chloride saturated brine may contain impurities from the source 12 such as clay or other dirt in fine particle form and as well, contains minute crystals of calcium sulphate. The calcium sulphate crystals may be simply this impurity which stems from the source 12 and has not dissolved in the hot brine, or it may be minute crystals of calcium sulphate which have recrystallized from the hot brine due to the fact that the calcium sulphate has inverse solubility as compared to the sodium chloride, i.e., the calcium sulphate tends to become less soluble upon increase in temperature.

The hot impure sodium chloride saturated brine is then directed to a settling tank 26 and either in the tank itself or in the hot brine line 24, a flocculent may be introduced as indicated by the reference character 28. It has been found that the introduction of conventional types of flocculents is effective to cause agglomeration of the relatively minute crystals of calcium sulphate so as to cause them to exist in sufficiently large lump size as to rapidly settle from the hot brine under the action of gravity whereafter they may be removed from the system as indicated by the reference character 30.

The hot brine is then passed as by a conduit 32 to a recrystallizer as indicated generally by the reference character 34 wherein the temperature and pressure of the hot brine are reduced to produce a cooled sodium chloride saturated brine at the outlet 36 and a slurry 38 which contains the recrystallized sodium chloride of high purity. The slurry is cycled to a filter, extracting and drying apparatus indicated generally by the reference character 40 from which the pure salt is extracted as at 42 and the brine at 44 is recycled back to the feed tank 10, substantially as is shown.

The system as described generally above has several advantages. First of all, it completely obviates the necessity for any filtering apparatus inasmuch as it has been found that relatively small amounts of flocculent introduced into the system as at 28 are capable of producing a purity of salt at 42 far in excess of that which was accomplished by the prior art methods utilizing the most advanced and exotic filtering apparatus. Moreover, the utilization of the flocculent allows uninterrupted and continuous operation, obviating the necessity of filter backwash cleaning. The prior art practices attempted to minimize the calcium sulphate dissolved incidental to the process because the dissolution of calcium sulphate with its subsequent recrystallization in the hot brine at 24 produces extremely fine particle size which is difficult, at best, to remove even with the most efficient of filtering systems. Because the introduction of flocculent is effective to agglomerate calcium sulphate particles of extremely small size, the system according to this invention may tolerate a larger percentage of calcium sulphate in this form. Thus, the brine at 36 and 14 may be cooled to a greater extent, thus to accept a greater proportion of calcium sulphate impurity from the salt source at 12, which after heating and saturating at 22, is recrystallized in fine particle size in the hot brine at 24.

Whereas the prior art systems might be effective to produce sodium chloride at the slurry output 38 which contains as little as about 9 p.p.m. calcium sulphate impurity, the addition of as little as 5 p.p.m. of flocculent at 28 is effective to reduce the calcium sulphate concentration to below detectable limits, i.e., less than about 1 p.p.m. As a matter of fact, by way of example, the utilization of as little as 0.04 p.p.m. produces a calcium sulphate concentration in the slurry at 38 which is wholly acceptable by previous standards. Consequently, the range of flocculent according to the present invention may be as little as 0.04 p.p.m. and may extend upwardly therefrom to as much as 5 p.p.m. if extreme purity is desired.

The flocculents which may be used in practicing the present invention may be any of the higher molecular weight polyelectrolyte coagulant-flocculent materials such as are exemplified by RETEN A-1, a product of Hercules Inc., disclosed in U.S. Pat. No. 3,336,269.

FIG. 2 illustrates a preferred embodiment of the present invention wherein the sodium chloride brine output 48 from the purified salt separator 50 together with the sodium chloride saturated brine output 52 is applied, together with impure salt input 54, to the salt feed tank 56. The mixture of sodium chloride brine plus entrained and suspended source salt at 58 is cycled by the pump 60 through the conduit 62 to a low temperature heater 64 from which the initially heated brine at 66 is pumped by means of the pump 68 through the conduit 70 to an intermediate temperature heater 72, the intermediate temperature brine being pumped from the conduit 74 by means of the pump 76 and through the conduit 78 to a high-temperature heater 80 for output at the conduit 82 and pump 84 to the saturator 86. The rather large quantity of solid source salt contained in the line 62 is partially dissolved due to the temperature rise in the heater 64 so that the line 70 contains a lesser amount of undissolved source salt; still more source salt is dissolved due to the action of the heater 72 so that the conduit 78 contains still less undissolved source salt and, finally, the heater 80 raises the temperature of the brine sufficient to carry a very small amount of undissolved source salt in the conduit 85. The temperature to and in the saturator 86 is, however, sufficient to dissolve this slight excess in the line 85, given time to do so and this is the purpose of the saturator device 86. The saturator device contains, suspended continuously therein, that amount of undissolved source salt carried through by the conduit 85 so that the output 88 of the saturator is a high temperature sodium chloride saturated brine. As specified hereinabove, the flocculent is introduced in minor amounts either directly into this hot brine conduit 88 or into the settling tank assembly 92, as may be desired.

The hot brine cycled into the settler 92 through the conduit 88 resides in the settler 92 sufficiently long as to enable the coagulated and/or flocculated calcium sulphate and other suspended solids to settle by gravity and separate from the hot brine, whereafter the impurity which has settled out may be removed from the lower region of the settling tank as indicated by the outlet 94. The effluent from the settling tank 92 is taken from an upper region thereof as indicated by the reference character 96 by means of a pump 98 which supplies the hot purified sodium chloride saturated brine in the conduit 100 to the first effect 102 of a multieffect evaporator assembly, second and third effects of which are indicated respectively by the reference characters 104 and 106. The hot purified brine is introduced into the recycling leg 108 of the first effect evaporator and the residual cooled brine from this first effect is extracted at the conduit 110 by means of a pump 112 and is directed by the conduit 114 to the recycling leg 116 of the second effect evaporator 104. The recycled, still further cooled sodium chloride saturated brine of the second effect is removed at 118 by means of pump 120 and cycled by means of the conduit 122 to the recycling leg 124 of the third effect evaporator 106. Lastly, the residual coolest sodium chloride saturated brine from the third effect evaporator is extracted through the conduit 126 by means of the pump 128 and cycled back as the sodium chloride saturated brine input 52 to the salt feed tank 56. Each of the evaporators includes a recrystallization accumulator leg 130, 132, or 134 having respective conduits 136 and 138 and 140 which extract the recrystallized salt in slurry form for application continuously through the conduit 142 to the separating apparatus 50, the purified salt output being indicated at 144.

As is conventional, pressure reduction is effected in each of the evaporators 102, 104 and 106 so as to cause boiling of the brine solutions therein and the resultant vapors are extracted through respective conduits 146, 148 and 150. The vapor extracted through the conduit 146 from the first effect evaporator is applied to the intermediate temperature heater 72, the vapor extracted through the conduit 148 of the second effect evaporator 104 is applied to the lower temperature heater 64 and the vapor extracted through the conduit 150 from the third effect evaporator 106 is applied to the condenser 152 whose discharge at 154 is to the well or pit 156. The water in the well 156 is carried by means of pump 158 and suitable feed and return lines 160 and 162 to the cooling tower 164 and a pump 166 withdraws the cooled water from this well for application to the condenser 152 through the conduit 168. To complete the system as shown, high temperature steam is supplied by means of the conduit 170 to the high temperature heater 80 and may also be applied to the heater 172 in the recycling system of the first effect heater 102.

What is claimed is:

1. The method of recrystallizing sodium chloride into high-purity, cubic crystal form from a source material of sodium chloride containing calcium sulphate impurity, which comprises the steps of:

forming from said source material a mother liquor which is a sodium chloride saturated brine containing dissolved calcium sulphate impurity and undissolved calcium sulphate impurity, maintaining said mother liquor at a temperature in excess of 200° F., adding acrylamide polymer flocculent to the hot mother liquor to agglomerate the undissolved calcium sulphate therein, separating the agglomerated calcium sulphate by gravity from the hot mother liquor to produce a purified mother liquor containing minimal calcium sulphate impurity which is substantially only dissolved calcium sulphate, reducing the temperature of the purified mother liquor to recrystallize sodium chloride therein, and then separating the recrystallized sodium chloride from the residual liquor.

2. The method according to claim 1 including the step of recycling and mixing the residual liquor with the source material to form the mother liquor.

3. The method according to claim 1 including the step of reducing the temperature of the purified mother liquor by multieffect evaporation.

4. The method according to claim 1 including the steps of reducing the temperature of the purified mother liquor by multieffect evaporation and progressively heating said mother liquor by contact with hot vapor extracted by the multieffect evaporation.

5. The method according to claim 4 including the step of recycling and mixing the residual liquor with the source material to form the mother liquor.

6. The improvement in a method for preparing a purified sodium chloride brine from a source material of sodium chloride containing calcium sulphate impurity, which comprises the steps of:

forming from said source material a mother liquor which is a sodium chloride saturated brine containing dissolved calcium sulphate impurities and undissolved calcium sulphate impurities, maintaining said mother liquor at a temperature in excess of 200° F., adding an acrylamide polymer flocculent to the hot mother liquor to agglomerate the undissolved calcium sulphate therein, and separating the agglomerate calcium sulphate by gravity from the hot mother liquor to produce a purified mother liquor containing minimal calcium sulphate impurity which is substantially only dissolved calcium sulphate.

* * * * *